FIG. 6.

TIME SEQUENCING FOR MONITORING THREE GROUPS

GROUP A – 3 OUT OF 5 CORRECT

GROUP B – 2 OUT OF 3 CORRECT

GROUP C – 2 OUT OF 4 CORRECT

|  | $t_1$ | $t_2$ | $t_3$ | $t_4$ | $t_5$ | $t_6$ | $t_7$ | $t_8$ | $t_9$ |
|---|---|---|---|---|---|---|---|---|---|
| GROUP A | ▪ |  | ▪ | ▪ |  | ▪ | ▪ |  |  |
| GROUP B | ▪ |  |  | ▪ |  |  | ▪ |  |  |
| GROUP C | ▪ |  |  | ▪ |  | ▪ | ▪ |  |  |
| INTERROGATE PULSES |  | ▪ |  |  | ▪ |  |  | ▪ |  |
| RESET PULSE |  |  |  |  |  |  |  |  | ▪ |

United States Patent Office 3,544,908
Patented Dec. 1, 1970

3,544,908
TIME CORRELATION PULSE CODING TECHNIQUE FOR SUPERVISORY CIRCUITS
Peter Wood, Highstown, N.J., and David John Hunter, Emsworth, Robert Edward Whyard, Weymouth, Dorset, and Albert Brian Keats, Dorchester, Dorset, England, assignors to United Kingdom Atomic Energy Authority, London, England
Filed May 23, 1966, Ser. No. 552,074
Claims priority, application Great Britain, May 28, 1965, 22,900/65
Int. Cl. H03k 5/18
U.S. Cl. 328—120                                    5 Claims

ABSTRACT OF THE DISCLOSURE

A supervisory circuit arrangement for monitoring purposes, comprises a group of coupled elements which are conditioned in accordance with the conditions on the respective group of conductors and which are arranged to be pulsed in timed sequence to product a train of output pulses corresponding in number to the number of correct electrical conditions existing on the conductors of the group. The trains of output pulses derived from the respective groups of elements are applied contemporaneously to pulse-responsive detectors to which interrogation pulses are applied, in a predetermined sequence with the pulses derived from the grouped elements, such that predetermined outputs are derived from the pulse-responsive detectors only if the requisite number of conductors in each of the groups are in the correct condition. In the event of one or more of the conductors of any group being in an "improper" condition the pulse train is shortened at its front end by the omission of one or more pulses.

Figure 1:
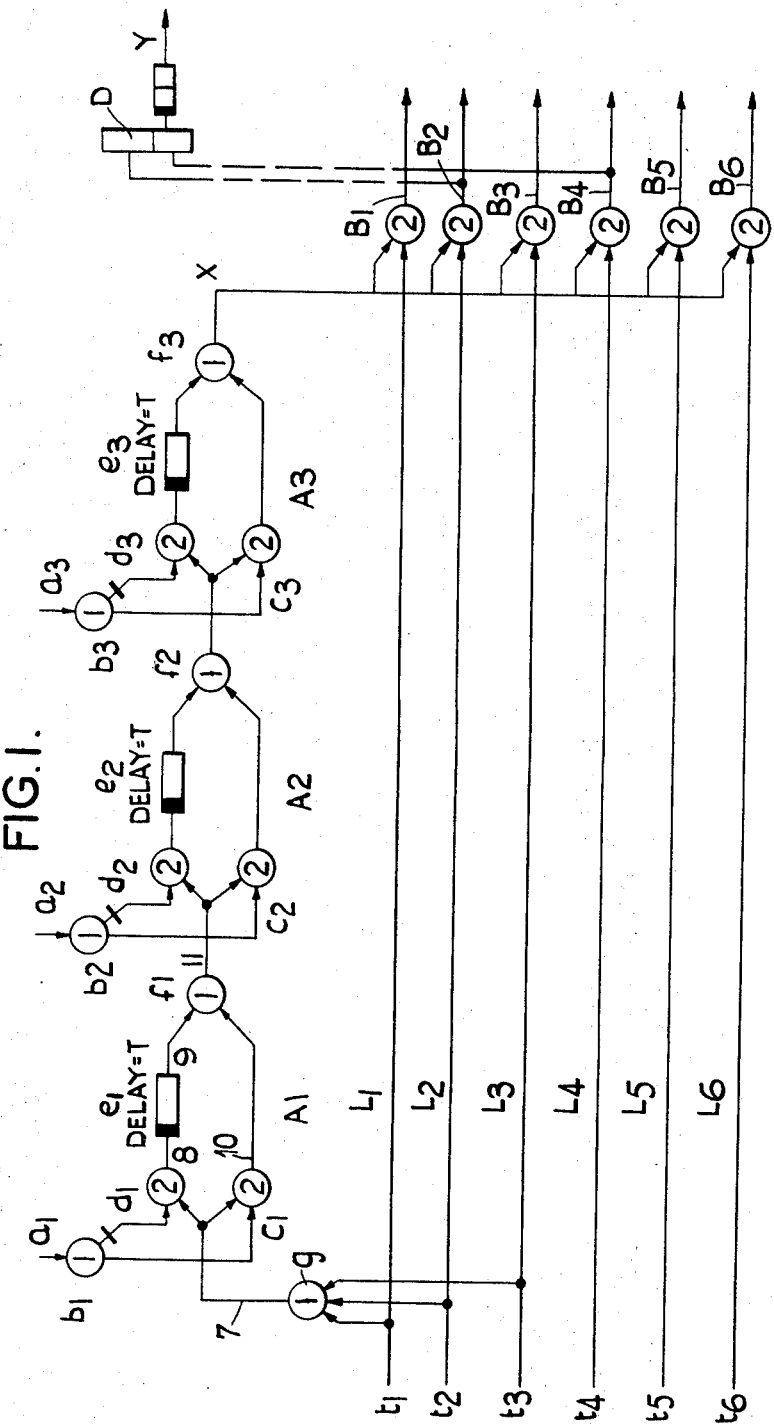

This invention relates to supervisory circuit arrangements and relates more specifically to such arrangements eminently suitable for monitoring the operation of nuclear reactors and associated equipment.

It may be required in nuclear reactor applications to monitor electrical conditions existing on groups of conductors each of which may appertain to a particular operating parameter of the equipment under supervision. If such electrical conditions found to exist on the conductors of a group are consistent with correct operation of the equipment or, if a predetermined number (usually a majority) of the conditions on such conductors are correct then the monitoring equipment permits continued operation of the equipment but any reduction in the number of correct conditions below said predetermined number results in the intervention of the monitoring equipment, as for example to trip or disable the equipment being monitored.

In conventional supervisory circuit arrangements for such monitoring purposes the conductors of each group are taken in various combinations to the inputs of "AND" gates with outputs from these gates signifying that all or the requisite number of conductors of the group are in the correct electrical condition. This arrangement although it is satisfactory for small groups of conductors, becomes increasingly complex and expensive where large groups of conductors are required to be monitored due to the large number of different combinations of conductors that can be formed from each group.

According to another supervisory arrangement the analogue of voltages or currents derived from the conductors of the groups is obtained and from this analogue a comparison is made with a fixed voltage or current, as the case may be, to assess the number of conductors of the group in the correct condition. This arrangement suffers from the disadvantage that it is dependent for its accurate operation on the availability of a highly stable voltage or current against which the analogue voltage or current output can be compared. Since the difference in analogue voltage between conditions signifying "safe" operation and "unsafe" operation can be very small it is often difficult, if not impossible, to achieve sufficiently accurate supervisory control.

According to the present invention a supervisory circuit arrangement for monitoring purposes as aforesaid comprises in respect of each group of conductors a group of coupled elements which are conditioned in accordance with the conditions on the conductors and which are arranged to be pulsed in timed sequence to produce a train of output pulses corresponding in number to the number of correct electrical conditions existing on the conductors of the group, the trains of output pulses derived from the respective groups of elements being applied contemporaneously to pulse-responsive detector means to which interrogate pulses are applied in predetermined sequence with the pulses derived from the grouped elements such that predetermined outputs are derived from the pulse-responsive detector means only if the requisite number of conductors in each of the groups are in the correct condition. In the event of one or more of the conductors of any group being in an "improper" condition the pulse train is shortened at its front end by the omission of one or more pulses.

A number of pulse responsive detector means may be connected to a single group of coupled elements to determine respectively whether exactly or at least a particular (different) number of control inputs are in the correct state, the pulse outputs from the pulse responsive detector means respectively may be utilised to control simultaneously different control processes which should be initiated, maintained or discontinued according to the availability of different numbers of control inputs in the correct state.

It will be readily appreciated that the supervisory arrangement of the present invention functions on a time analogue basis and its accuracy of operation can therefore readily be assured by the employment of clock time pulses for the pulsing of the elements and interrogation purposes.

The pulse outputs derived from the pulse responsive detector means may be utilised to afford an indication as to whether the equipment being monitored is in a perfect operating condition or whether the equipment is faulty but "safe." This may be achieved by arranging that a first output pulse from the pulse responsive detector means upon the occurrence of the first interrogate pulse conditions a discriminator circuit element, a further pulse from the detector means brings about the operation of the conditioned circuit element for the provision of an output indication that the equipment being monitored is "safe" while conditioning a further element and yet another pulse from the detector means causing operation of the further conditioned element to produce an output signifying that the equipment being monitored is perfectly healthy.

The elements conditioned by the electrical conditions existing on the conductors of the groups may comprise conventional transistor logic modules or square loop magnetic core devices arranged to be triggered for the production of a pulse in response to a change in condition of the core devices from a "reset" condition to a "set" condition. The electrical conditions on the group conductors at least initially determine the actual condition of the magnetic cores.

Figure 2:
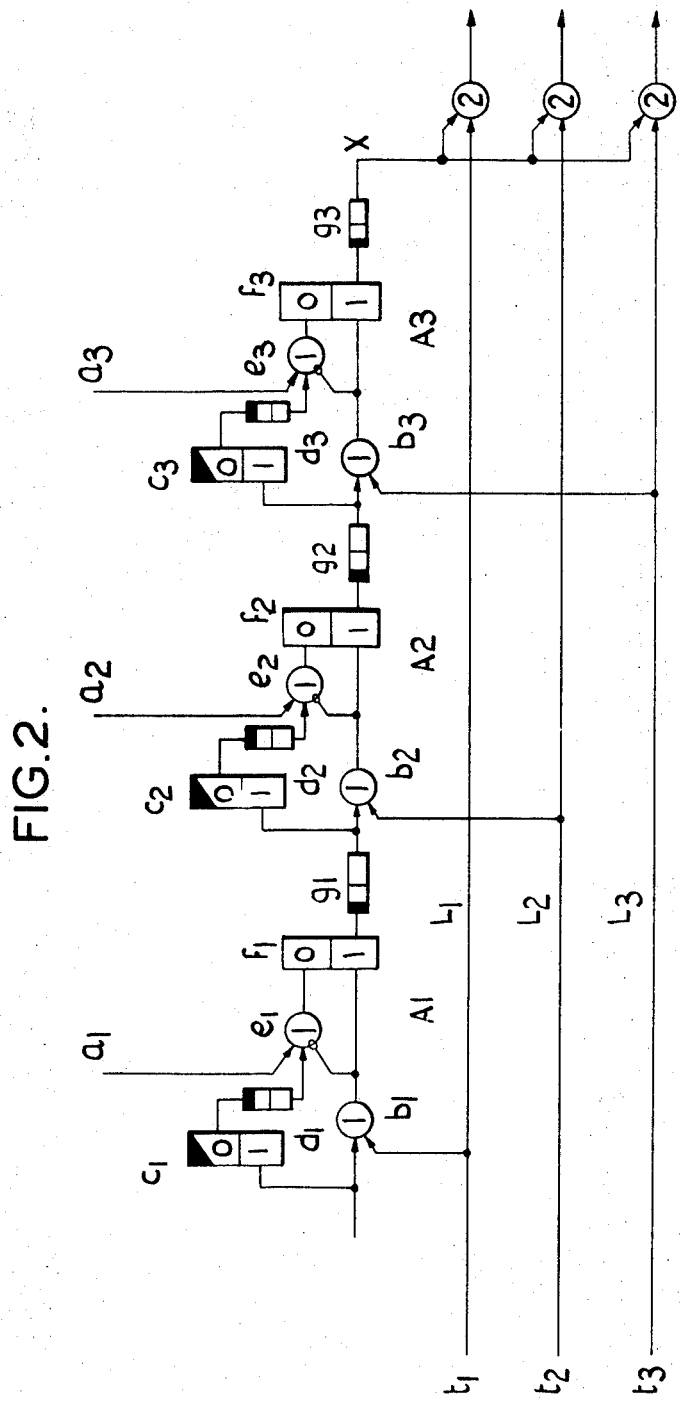
Figure 3:
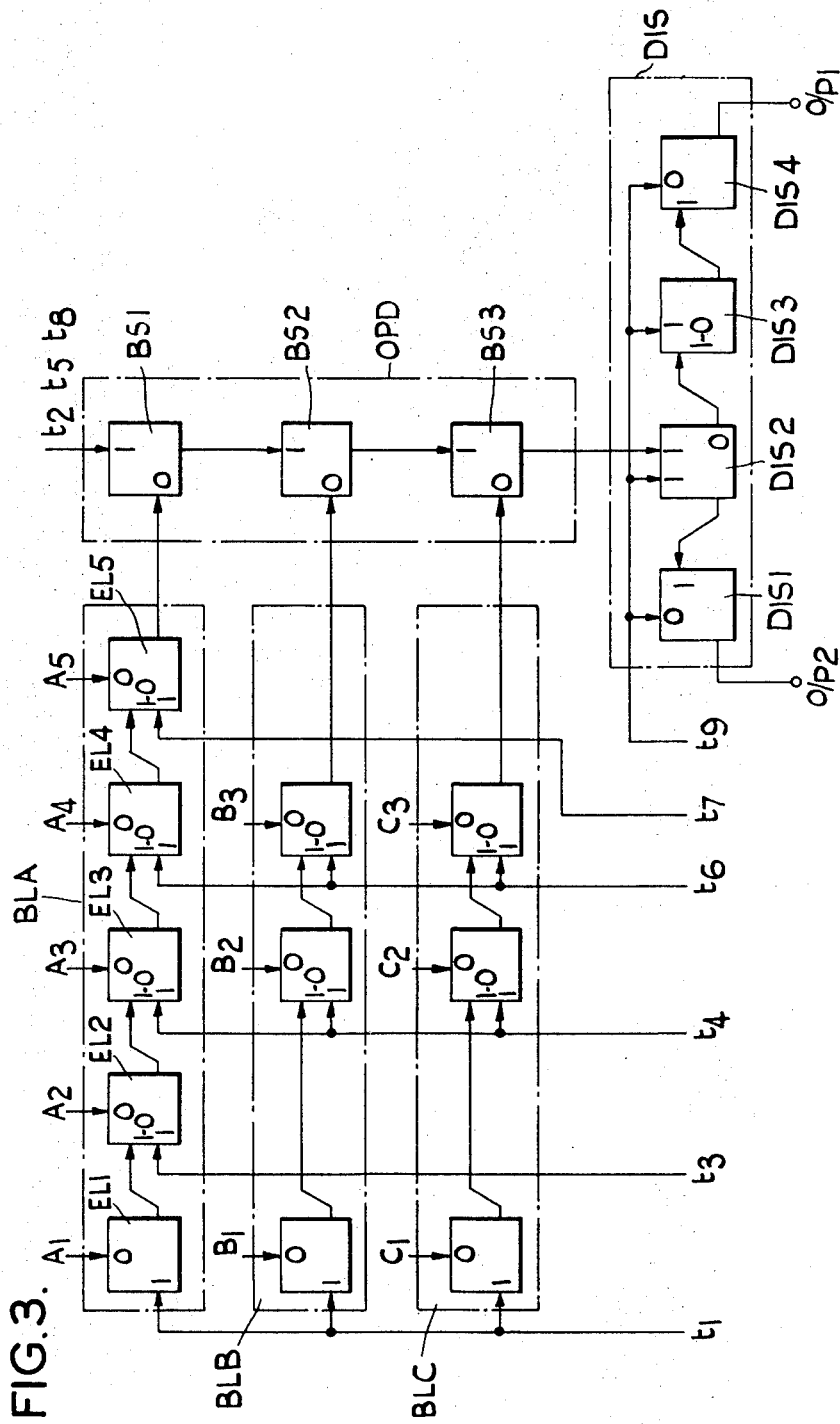
Figure 4:
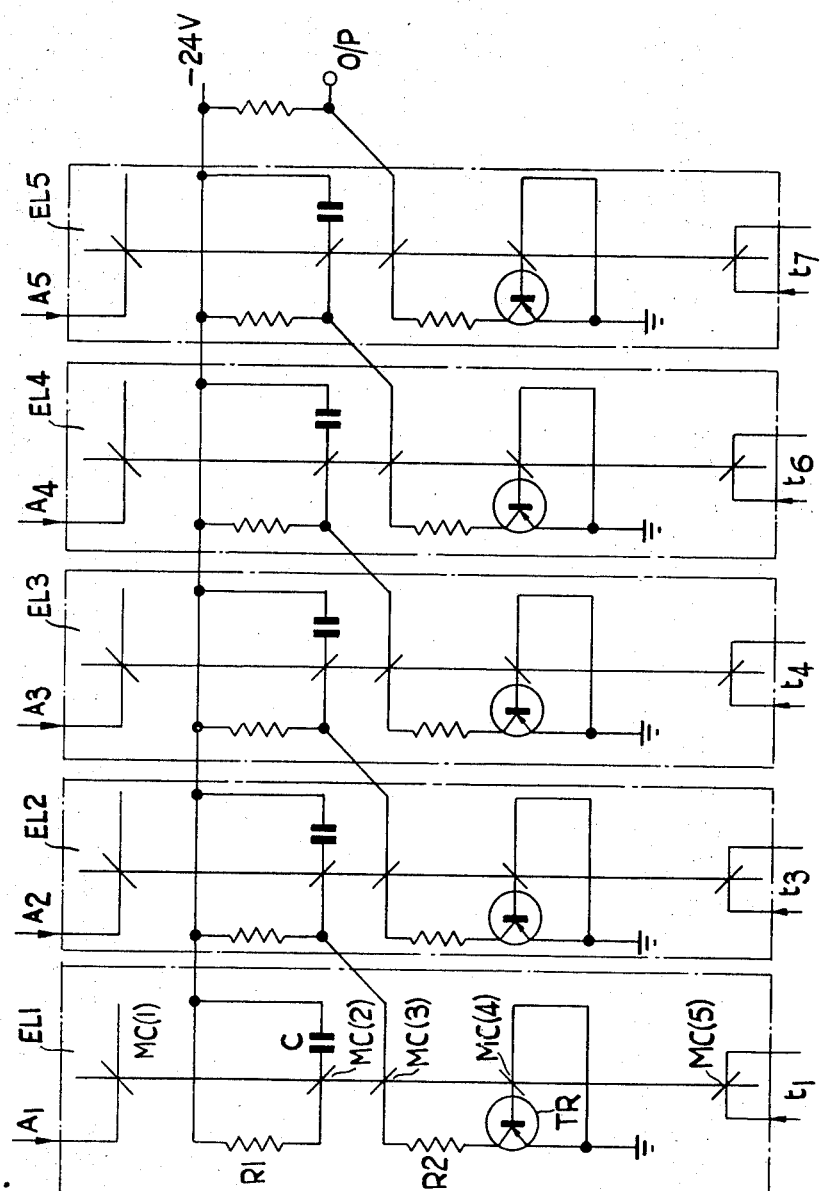
Figure 5:
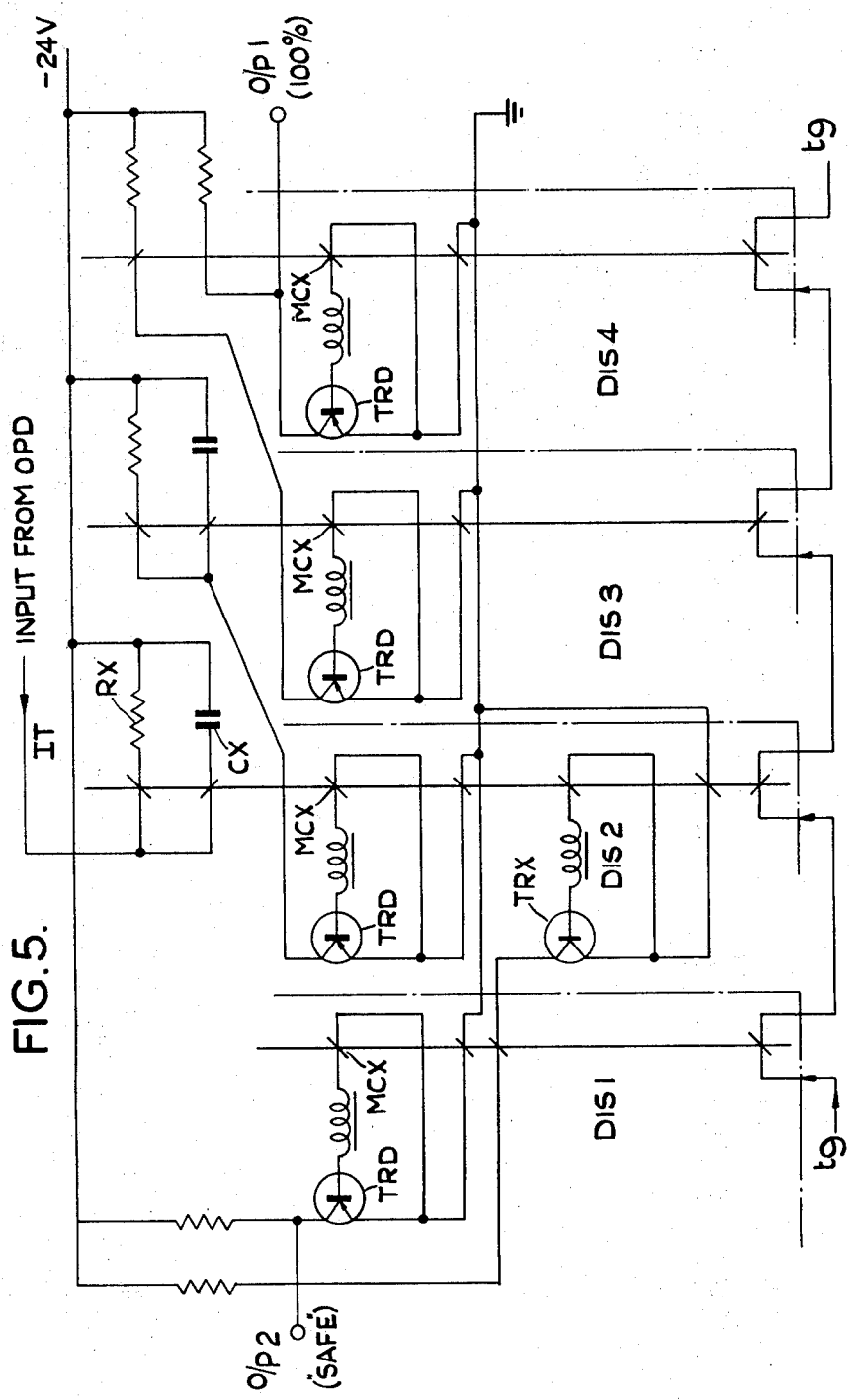

By way of example three forms of supervisory circuit arrangement according to the present invention will now be determined with reference to the accompanying drawings in which:

FIG. 1 is a block schematic diagram of one form of supervisory circuit arrangement, FIG. 2 is a block schematic diagram of a second form of supervisory circuit arrangement, FIG. 3 is a block schematic diagram of a third form of supervisory circuit arrangement, FIG. 4 is a circuit diagram showing the elements associated with the conductors of one group of conductors, FIG. 5 is a circuit diagram of the discriminator circuit of the supervisory arrangement according to FIG. 3, and FIG. 6 is a chart showing the typical time sequencing of pulses for the supervisory arrangement of FIG. 3.

FIG. 1 shows a typical circuit arrangement for three controlling inputs. The circuits consist of three stages one for each controlling input and may be extended to more inputs by adding the corresponding number of stages. In this scheme a fixed pulse pattern is produced at the output, point X on FIG. 1 and the pattern is displaced in time relative to the applied clock pulses by an amount proportional to the number of controlling inputs in the incorrect condition.

Referring to FIG. 1 the controlling inputs $a_1$, $a_2$, $a_3$ are applied to the gates $b_1$ to $b_3$ respectively of three similar logic stages, A1, A2 and A3, which are connected in series. Each of the gates $b_1$, $b_2$ or $b_3$ provides two outputs in opposite states which respectively are applied to the "AND" elements and $c_1$ and $d_1$, $c_2$ and $d_2$ or $c_3$ and $d_3$.

If the controlling input is in the correct condition element $c_1$, $c_2$ or $c_3$ is primed and element $d_1$, $d_2$ or $d_3$ is inhibited. If the controlling input is incorrect the reverse situation applies, i.e. element $c_1$, $c_2$ or $c_3$ is inhibited, and element $d_1$, $d_2$ or $d_3$ is primed.

Clock pulses $t_1$ to $t_5$ are applied sequentially to conductors L1 to L6 respectively, the clock pulse widths and repetition rates being suitably chosen for the logic elements employed. Clock pulses $t_1$, $t_2$ and $t_3$ are connected to the OR element $g$ so that each of these clock pulses produces a pulse at conductor 7, which is applied in parallel to the AND elements $c_1$ and $d_1$ of stage A1. An output pulse is generated on either conductor 10 or conductor 8 according to the conditions imposed on elements $c_1$ and $d_1$ by the controlling input. If the output pulse occurs on conductor 10, i.e. if the controlling input is in the correct condition, the pulse is applied directly to element $f_1$, and an output occurs at conductor 11 which is connected to the next stage. If the controlling input is not in the correct condition the output pulse occurs on conducor 8 via element $d_1$, and is routed to element $e_1$ which delays the transmission of the pulse by an amount T equal to the time interval between two consecutive clock pulses before applying it to element $f_1$ to produce an output on conductor 11.

Thus the pulse applied to conductor 7 at time $t_1$ is either transmitted directly, to conductor 11, so that apart from propogation delays a pulse is applied simultaneously to stage A2 when the controlling input to stage A1 is correct, or the pulse due to clock pulse $t_1$ is delayed by element $e_1$ if the controlling input is not correct, so that it is applied to stage A2 one clock pulse interval later, that is at the same time as clock pulse $t_2$ is applied to stage A1.

This process is repeated in stages A2 and A3 according to the condition of the controlling inputs $a_2$ and $a_3$ respectively. The output pulse pattern produced at point X at the end of the circuit therefore consists of three pulses in the case being considered, which occur at the same repetition rate as clock pulses $t_1$, $t_2$ and $t_3$ but which are displaced in time relative to the latter by an amount determined by the number of controlling inputs in the incorrect condition.

The output at point X is applied to a number of pulse responsive detector elements, B1 to B6 according to the information required which are primed in sequence by the corresponding clock pulses so that an output is obtained from a detector element once per clock cycle when a pulse in the output pattern at point X coincides with the corresponding priming clock pulses. The outputs from the detectors B1–B6 provide an indication of the least number of inputs available in the correct or incorrect state. Outputs relating to an exact number of controlling inputs being correct or incorrect may be obtained by connecting an additional bistable element D to the outputs from the appropriate detectors B1–B6 as, indicated at FIG. 1. In the example shown the bistable element D is set to the 1 state if at least two controlling inputs are correct, and is returned to the 0 state if at least one input in incorrect. Thus the output at Y confirms that exactly two controlling inputs are correct.

An alternative circuit is illustrated by FIG. 2. This shows a typical arrangement of a circuit for three controlling inputs; it consists of three stages A1, A2, A3, each respectively controlled by one of the controlling inputs. The circuit may be extended to more inputs by introducing the corresponding number of stages. With this circuit the number of pulses produced in the output pulse pattern at a point X during one cycle of the clock pulses, equals the number of controlling inputs in the correct condition. In this case each controlling input in an incorrect condition results in the loss of an output pulse from the front end of the pattern.

Each stage comprises the elements $b$, $c$, $d$, $e$, $f$, $g$ identified with the respective stages A1, A2 or A3 by suffixes 1, 2 and 3. The controlling input to the stage is applied via element $e$ to the bistable element $f$ which is reset to the 0 state if the controlling input is correct. Driving pulses are applied to element $b$, and routed in parallel to inhibit element $e$ and to set the bistable $f$ to the 1 state. The output from the bistable element $f$ when it is switched to state 1 is applied to the pulse element $g$ to produce an output from the stage. Thus while the controlling input is correct each driving pulse applied to the stage produces an output pulse.

The driving pulses are applied by one of two routes to element $b$; either from the previous stage or from a corresponding conductor in a clock pulse distribution system $L_1$ to $L_3$. The arrangement of the overall circuit is such that a driving pulse from the clock pulse distribution system is always the last pulse to be applied to a stage in each cycle of clock pulses.

Driving pulses from the previous stage are routed to element $b$ and to the bistable element $c$ in parallel. When the first driving pulse arrives from the previous stage, the output from element $b$ switches the bistable element $f$ if the controlling input is in the correct condition. If the controlling input is not correct, no output is obtained from the stage when the first driving pulse is applied. However this pulse is also routed to the bistable element $c$ and sets the latter to the 1 state, at the end of the pulse this element $c$ reverts back to the 0 state and produces an output which acting through elements $d$ and $e$ resets bistable element $f$. The next driving pulse to the stage is now able to switch bistable element $f$ and produces an output from the stage. If this latter driving pulse is also applied in the same way it again operates bistable element $c$ so that following the pulse the output from $c$ resets bisable element $f$. This process is repeated as long as driving pulses continue to be applied from the preceding stage.

The last driving pulse in each cycle of the clock pulses is obtained directly from the corresponding clock pulse conductor. The pulse switches bistable element $f$ if it has been reset either by the controlling input or by the bistable element $c$ following a preceding driving pulse. This driving clock pulse however is not applied to bistable element $c$ and consequently the state of the bistable element $f$ following the pulse is determined only by the condition of the controlling input. If the latter is correct element $f$ is reset to the 0 state, while if the controlling input is not correct element $f$ remains in the 1 state until the next clock cycle commences.

Each stage of the circuit therefore transmits all the driving pulses applied to it during each cycle of the clock pulses while its controlling input is correct. While if the latter is in the incorrect condition the stage blocks the first driving pulse in each cycle but transmits all the remainder. By arranging a number of such stages in series as shown the number of pulses in the output pattern from the last stage (point X at FIG. 2) is reduced by one for each controlling input in the incorrect state. Thus the number of pulses remaining equals the number of controlling inputs available in the correct condition.

The output at point X on the circuit is applied to the pulse responsive detectors to extract information on the number of controlling inputs in the correct condition in the same manner as described with reference to FIG. 1. However with the arrangement of FIG. 2 information on the precise member of incorrect inputs present requires more complicated detector elements.

In FIG. 3 of the drawings, it will be seen that three groups of conductors, comprising conductors A1 to A5, B1 to B3 and C1 to C3 are associated, respectively, with individual blocks of circuit elements shown at BLA, BLB, and BLC. Each of these groups of conductors such as the conductors A1 to A5 may appertain to a particular operating parameter (e.g. temperature) of equipment to be monitored such that all the conductors of the group in question will be in the same electrical potential condition when the parameter concerned is 100% correct. An improper parameter is signified by one or more of the conductors of the group being in a different electrical condition (e.g. the absence of DC potential). The purpose of the supervisory circuit arrangement is to ascertain whether the number of conductors of the groups not in the proper electrical condition exceeds a number consistent with "safe" operation of the equipment.

In the example taken it can be seen that the supervision of three parameters is catered for, but it will be appreciated that different numbers of parameters may be monitored by the supervisory arrangement. Considering the blocks, such as the block BLA each of these consist of a number of elements to be described more fully later, which are associated individually with the conductors of the appertaining group so that an element may be conditioned by the electrical, potential condition existing on the conductor in question. For example, the conductors A1 to A5 are associated, respectively, with, and therefore condition, elements EL1 to EL5 of the block BLA.

Pulses occurring in predetermined time sequence conveniently referred to as $t1$ to $t9$ are derived from a suitable pulse source (e.g. pulse clock). Pulses $t1$, $t3$, $t4$, $t6$ and $t7$ are applied as indicated to the elements of the blocks BLA, BLB and BLC. Pulses $t2$, $t5$ and $t8$ are applied as interrogate pulses to an output pulse detector circuit OPD while pulse $t9$ is applied for resetting purposes to a discriminator circuit DIS.

Briefly, the operation of the circuit arrangement is such that pulses $t1$, $t3$, $t4$, $t6$ and $t7$ are applied sequentially to the elements of the blocks BLA, BLB and BLC. The elements are conditioned by the electrical conditions obtaining on the group conductors associated with it. If all of the conductors are in the correct electrical condition then a train of output pulses is derived from each of the blocks corresponding in number to the number of conductors in the appertaining group (i.e. 5 pulses) from BLA and 3 pulses each from BLB and BLC). If one or more of the conductors of the group are not in the proper electrical condition then a number of pulses corresponding in number to the number of conductors in the improper condition will be omitted from the front end of the output pulse train derived from the block in question irrespective of the position of the conductors in the group. To take one specific example, if the conductors A3 and A5 were in the incorrect condition the train of output pulses from the block BLA would consist of three pulses in all corresponding to the input pulses $t4$, $t6$ and $t7$. Output pulses corresponding to pulses $t1$ and $t3$ would be omitted. Thus conductors in the improper electrical condition irrespective of their position in the group are signified by the absence of one or more output pulses at the front end of the output pulse train. It is this facility of indicating faults by that omission of pulses from the front end of a number of trains of impulses that enables the output trains from a number of group conductors appertaining to different parameters to be fed to a common output pulse detector circuit OPD for detecting faults.

The detector circuit OPD may comprise bistable switching devices BS1 to BS3 associated, respectively, with the blocks BLA, BLB and BLC. The operation of the detector circuit is such that the bistable devices BS1 to BS3 are set from the "0" condition to the "1" condition by an output pulse from the appertaining block. Only when all of the bistable devices are in the "set" condition will an output pulse be derived from the discriminator circuit OPD for the application to the discriminator DIS. Assuming that all of the group conductors are in the correct electrical condition then all of the bistable devices BS1 and BS2 and BS3 will be in the set condition when the pulses $t2$, $t5$ and $t8$ occur. More specifically, when the pulse $t1$ is applied in common to the first elements of the blocks BLA, BLB, and BLC each of these elements will produce an output pulse which is propagated from one element to another along the block to the output and if all the conductors are in the proper condition. These output pulses turn over bistable switching devices BS1 to BS3. Pulse $t2$ when it is applied to the output pulse detector circuit OPD "resets" the bistable circuit BS1 and in so doing an output pulse from this bistable circuit is applied to bistable circuit BS2 to cause this circuit to be "reset" and provide an output pulse which in turn "resets" the bistable circuit BS3 which accordingly produces the output pulse which is fed to the discriminator DIS. The same operating sequence occurs when pulses $t5$ and $t6$ are applied to the output pulse detector circuit OPD in appropriate timed sequence. Thus three output pulses will be derived from the detector circuit OPD if the three parameters are 100% healthy. If faults are present then two or less output pulses will be derived from the detector circuit OPD since at least the first output pulse of one or more of the trains from blocks BLA to BLC will be omitted from the front end of the pulse train or trains so that the bistable circuit or circuits associated with that block or blocks will be in the "reset" condition when the pulse $t2$ occurs. If three output pulses are received by the discriminator DIS from the detector circuit OPD then an output signal will be produced on an output terminal OP1 thus signifying that the parameters are 100% correct. If two output pulses only, corresponding to the pulses $t5$ and $t8$, are received by the discriminator DIS, then an output signifying that the parameters are "safe" will be produced at an output terminal OP2. If, however, one output or no output is received by the discriminator DIS thus signifying that the parameters are in an "unsafe" condition no output will be derived from the output terminals OP1 and OP2 and the absence of such output may be utilised for the giving of an alarm or the disabling of equipment, as required. The discriminator circuit DIS will be described in more detail later with reference to FIG. 5, but it may here be mentioned that the discriminator comprises a number of elements DIS 1 to DIS 4 which are operated and/or conditioned in accordance with incoming pulses received from the pulse-responsive detector circuit OPD.

Turning now to FIG. 4 of the drawings, this shows the elements EL1 to EL5 of the block BLA (FIG. 3). Each of these elements, such as the element EL1, comprises a square loop magnetic core having five windings MC(1) to MC(5) associated with it. Winding MC(1) is connected to the appertaining group conductor, such as the conductor A1; winding MC(2) is connected in a capacitor charge/discharge circuit comprising a capacitor C in series with a resistor R1; windings MC(3) and MC(4) are connected in the collector and base circuits, respectively, of a transistor TR having a collector resistor R2; and, winding MC(5) is connected to an appropriate pulse source for pulses *t*1, *t*3, etc.

The collector circuit of the transistor of each of the elements EL1 to EL4 is coupled to the capacitor charge/discharge circuit of the next element of the block, that is to say the element EL1 for example is coupled to the element EL2 and so on. This enables an output pulse to be propagated along the block from left to right and delivered at an output pulse terminal OP which is connected to output pulse connector circuit OPD (FIG. 3).

For the purposes of description let it be assumed that the conductors when in the correct condition thereof have applied to them a DC potential which conditions the magnetic cores of the associated elements to the "reset" state and that an improper condition on the conductor results in the appertaining magnetic core being in the "set state." Assuming first of all that the conductors A1 to A5 are properly conditioned so that the magnetic cores of the elements EL1 to EL5 are in the "reset" state, when pulse *t*1 is applied to the element EL1 the magnetic core of this element switches to produce an output which triggers the transistor TR. Transistor TR in conducting applies a pulse to the capacitor charge/discharge circuit appertaining to element EL2 and by so doing the pulse produced in winding MC(2) of element EL2 causes the magnetic core of element EL2 to switch and produce an output pulse for triggering its own transistor TR. Thus an output pulse is propagated along the block from one element to another until an output is derived from the output terminal OP. It will be appreciated that as the transistor cuts off the capacitor of the capacitor charge/discharge circuit of the element EL2 discharges to cause restoration of the magnetic core to the "reset" state in readiness for the next input pulse. Upon the occurrence of the input pulse *t*3 the sequence is repeated for elements EL2 and EL5 to produce a second pulse at the output teminal OP and for subsequent pulses *t*4, *t*6 and *t*7 the operation is similar for a reducing number of elements towards and including the element EL5. Thus five output pulses in all will have been delivered to the output terminal OP at the end of one cycle of the pulses *t*1 to *t*9. It will be remembered that the intermediate pulses *t*2, *t*5 and *t*8 are used for interrogation purposes, being fed to the output pulse detector circuit OPD.

Now let it be assumed that the conductor A2 is in an improper condition while the conductors A1 and A3 to A5 are in a proper electrical condition. In this case the magnetic core associated with the group conductor A2 will be in the "set" state. In this event when the input pulse *t*1 is applied to the element EL1 transistor TR is triggered as before and causes the capacitor of the capacitor charge/discharge circuit of the element EL2 to charge but an output pulse is not produced from the magnetic core of the element EL2 since the core is in the "set" state. Consequently, the transistor TR of element EL2 does not conduct so that propagation of a pulse along the block towards the output terminal OP is prevented with the result that the first pulse of the train of output pulses from the block is omitted. At the end of the conducting period of the transistor TR the capacitor C discharges and this causes the magnetic core of element EL2 to be switched to the "reset" state. The output pulse detector will detect this absence of the first pulse when pulse *t*2 is applied to it for interrogation purposes.

When pulse *t*3 is applied to the element EL2 the transistor TR of element EL2 is triggered due to the switching of its core to the "set" state and an output pulse is propagated along the block from one element to another by the successive triggering of the transistors in succeeding elements.

Thereafter the pulses *t*4, *t*6 and *t*7 each cause a further pulse to be propagated along the block to the output terminal OP. Thus it will be appreciated that in all, four output pulses are delivered to the output pulse terminal OP.

Taking now the case where the conductors A3 and A5, say have incorrect conditions applied to them. In the case where pulse *t*1 is applied to the element EL1 the transistors TR of element EL1 and EL2 will trigger in succession, but the pulse delivered by the transistor of the element EL2 will not be propagated by the element EL3 due to the failure of the transistor TR of the element EL3 to trigger, this resulting from the core of this element being in the set state. The core is simply switched to the "reset" state when the capacitor of the capacitor charge/discharge circuit discharges. No output from the output pulse terminal OP is provided.

When the pulse *t*3 is applied to the element EL2 the transistor of EL2 triggers followed by the triggering of the transistors of elements EL3 and EL4 but this time the transistor of the element EL5 does not trigger since the magnetic core of this element is in the "set" state. The capacitor of the capacitor charge/discharge circuit of the element, however, causes the magnetic core of the element EL5 to be "reset" when the transistor TR is cut off so that subsequent pulses *t*4, *t*6 and *t*7 cause pulses to be propagated through the block to the output terminal OP. Thus the first two pulses of the pulse train are omitted so as to signify that two of the conductors of the group are in the incorrect condition. It will be appreciated that the pulses are omitted from the front end of the pulse train irrespective of the position of the conductors within the conductor group. Thus the arrangement provides in effect a time analogue fault indication arrangement since the period prior to the commencement of the output pulses or the duration of the pulse train provides fault indication. By virtue of accuracy of the timing clock time pulses an extremely accurate indication can be afforded by the arrangement in accordance with the invention.

The operation of the blocks BLB and BLC will be similar to that of block BLA just above described.

Turning now to FIG. 5 of the drawings, this shows the discriminator DIS (FIG. 3) which comprises four elements DIS 1 to DIS 4 each of which comprises a square loop magnetic core device, such as the device MCX and an associated transistor TRD. The element DIS 2 includes an additional transistor TRX.

Linking with each of the magnetic cores of the element is a pulse conductor to which the pulse *t*9 is applied at the end of the pulse sequence. The pulse *t*9 conditions the cores, so that the cores of elements DIS 2 and DIS 3 are in the "set" state while the cores DIS 1 and DIS 4 are in the "reset" state.

If it is assumed that the conductors of all the groups A, B, and C are in the proper electrical condition then three successive pulses are derived from the output pulse detector circuit as previously described. The first of these pulses applied to the input conductor IT simply serves to charge the capacitor CX of the capacitor charge/discharge circuit.

At the end of this pulse when the capacitor CX discharges the condition of the magnetic core of the element DIS 2 changes to the "reset" state.

When the second of the pulses from the output pulse detector circuit OPD is received by the discriminator over the conductor IT the magnetic core of the element DIS 2 is switched to the "set" state to produce an output pulse which serves to trigger the transistors TRD and TRX and in so doing the core of the element DIS 1 switches which in turn causes transistor TRD of the latter element to trigger to produce an output at the output terminal O/P2. It is this output that signifies that the group conductors are in the "safe" condition.

As the capacitor CX discharges at the end of the second pulse the magnetic core elements DIS 2, 3 and 4 are in the "reset" state, whereas that of the element DIS 1 is in the set state. Upon the occurrence of the last pulse from the output pulse detector circuit OPD all of the magnetic cores of the respective units DIS 1 to DIS 4 are changed to the "set" state, and the magnetic core of the unit DIS 4 in changing to the "set" state produces an output pulse which triggers the transistor TRD to deliver an output pulse to the output terminal OP1. This pulse delivered to the output pulse terminal OP1 signifies that all of the conductors of the groups are in the correct condition.

After the termination of the last of the three pulses delivered to the discriminator circuit DIS the capacitors discharge to cause the magnetic cores to revert to the states assumed by these cores prior to the arrival of the last pulse. Finally, the application of a pulse $t9$ to the pulse conductor brings about resetting the magnetic cores to their initial states.

The sequence of operations of the setting and resetting of the cores of the discriminator is indicated by the following table in which the numeral "1" indicates the "set" state and the numeral "0" indicates the "reset" state.

It will be appreciated that the number of incorrect conditions on the group conductors to bring about the giving of an alarm may vary according to requirements. However, a typical time sequencing arrangement is depicted in FIG. 6 for detecting that three out of five conductors of one group, two out of three conductors of another group, and two out of four conductors of yet another group are in the proper electrical condition.

TABLE

| Pulse Phase | Resulting state of magnetic core | | | |
|---|---|---|---|---|
| | DIS 2 | DIS 3 | DIS 4 | DIS 1 |
| $t9$ | 1 | 1 | 0 | 0 |
| $t2$ | 1 | 1 | 0 | 0 |
| Capacitor discharge | 0 | 1 | 0 | 0 |
| $t5$ | 1 | 1 | 0 | 1 |
| Capacitor discharge | 0 | 0 | 0 | 1 |
| $t8$ | 1 | 1 | 1 | 1 |
| Capacitor discharge | 0 | 0 | 0 | 1 |
| $t9$ | 1 | 1 | 0 | 0 |

We claim:

1. A supervisory circuit arrangement for monitoring a group of separate conductors to establish a number of these conductors are in a correct condition comprising, source means for producing a train of pulses, means for connecting a number of controlling inputs to a respective conductor, a plurality of control circuits each responsive to a respective controlling input for producing an output in accordance with the conditions on a respective conductor, means for applying pulses from said source means to said control circuits, and a series connection between said control circuits so that a pulse leaving one control circuit is applied to a succeeding control circuit, said control circuits each comprising a one pulse period delay device and gate means responsive to said controlling inputs for passing pulses applied thereto without substantial delay to a succeeding control circuit, in response to controlling inputs corresponding to correct conditions, and for passing pulses applied thereto to said delay device so that pulses applied to a succeeding circuit are delayed by one pulse interval, in response to controlling inputs corresponding to incorrect conditions.

2. An arrangement as claimed in claim 1 wherein said source means comprises a clock pulse generator for emitting a train of clock pulses during each cycle of operation.

3. An arrangement as claimed in claim 2 further comprising an input channel associated with each of said control circuits, each including a two-way gate responsive to a coresponding channel for passing an input pulse without delay in the presence of finite input information and for delaying an input pulse by means of said delay device in the presence of zero input information to thereby achieve a shift of one pulse interval depending on the input information.

4. An arrangement as claimed in claim 2 further comprising an input channel associated with each of said control circuits, said control circuits including means for transmitting pulses only if previously conditioned to do so by a previous finite input information signal, said control circuits being connected in a chain so that an output from a first control circuit can act as a conditioning signal for a succeeding control circuit in the absence of finite input information whereby the train of pulses is shifted by the loss of the leading pulse in the train.

5. A supervisory circuit arrangement for monitoring electrical signals existing on groups of conductors comprising, a group of coupled control circuits associated with each group of conductors for producing an output in accordance with the conditions on the conductors, means for applying a series of timed pulses to said control circuits to produce a train of output pulses corresponding in number to the number of correct electrical conditions existing on the conductors of the groups, pulse responsive detector means, means for applying the trains of output pulses derived from respective groups of said control circuits to said detector means, and means for applying interrogate pulses to said detector means in predetermined sequence with respect to the pulses derived from said control circuit groups such that predetermined outputs are produced by said detector means only if the requisite number of conductors in each of the groups are in the correct condition.

References Cited

UNITED STATES PATENTS

| 3,024,444 | 3/1962 | Barry et al. | 235—153X |
| 3,112,450 | 11/1963 | Krausey | 328—97X |
| 3,271,566 | 9/1966 | Martens | 307—242X |

DONALD D. FORRER, Primary Examiner

R. C. WOODBRIDGE, Assistant Examiner

U.S. Cl. X.R.

307—243; 328—55, 97; 340—146.1